United States Patent [19]

Hamersma et al.

[11] Patent Number: 5,025,055

[45] Date of Patent: Jun. 18, 1991

[54] POLYMER MIXTURE COMPRISING AROMATIC POLYCARBONATE AND TWO AGENTS TO IMPROVE THE IMPACT STRENGTH; ARTICLES FORMED THEREFROM

[75] Inventors: Wilhelmus J. L. A. Hamersma; Torben P. Kempers, both of Bergen op Zoom; Wilhemus M. M. Roovers, Steenbergen, all of Netherlands

[73] Assignee: General Electric Company, Mt. Vernon, Ind.

[21] Appl. No.: 446,733

[22] Filed: Dec. 6, 1989

[30] Foreign Application Priority Data

Dec. 19, 1988 [NL] Netherlands ................... 8803113

[51] Int. Cl.$^5$ ................................. C08K 5/24
[52] U.S. Cl. ........................... 524/269; 523/201; 523/212; 525/67; 525/101; 525/902
[58] Field of Search ............... 523/201; 525/67, 101; 524/269

[56] References Cited

U.S. PATENT DOCUMENTS 4,942,188 7/1990 Hamarsma et al. ............... 524/267

FOREIGN PATENT DOCUMENTS 174510 3/1986 European Pat. Off. ........... 524/267
254054 1/1988 European Pat. Off. ........... 525/67

Primary Examiner—Joseph L. Schofer
Assistant Examiner—Mark Sweet
Attorney, Agent, or Firm—Martin B. Barancik

[57] ABSTRACT

A polymer mixture having a lower ductile/brittle fracture transition temperature is obtained by adding a dialkyl silicone fluid polymer to a polymer mixture which comprises an aromatic polycarbonate and two agents to improve the impact strength.

8 Claims, No Drawings

POLYMER MIXTURE COMPRISING AROMATIC POLYCARBONATE AND TWO AGENTS TO IMPROVE THE IMPACT STRENGTH; ARTICLES FORMED THEREFROM

The invention relates to a polymer mixture which comprises A an aromatic polycarbonate, B a first agent to improve the impact strength built up from a core which consists substantially of a diene rubber and on which at least one shell has been grafted consisting substantially of $C_{1-6}$ alkyl acrylates and/or $C_{1-6}$ alkylmethylacrylates and C comprises a second agent to improve the impact strength consisting of a block copolymer with polycarbonate blocks and polysiloxane blocks.

The invention further relates to a method of preparing polymer mixtures of the type mentioned hereinbefore and to articles formed from such polymer mixtures.

Polymer mixtures which comprise an aromatic polycarbonate and two different agents to improve the impact strength as described hereinbefore are disclosed in EP-A-0254054. The known polymer mixtures have a good impact strength, at room temperature and at low temperatures, and a good environmental stress crack resistance (ESCR).

The invention provides polymer mixtures of the type meant hereinbefore having further improved properties, notably a lower transition temperature from ductile to brittle fracture and a better thermal stability.

The polymer mixture according to the invention is characterised in that it comprises in addition as constituent D a dialkyl silicone fluid polymer.

The use of dialkyl silicone fluid polymers in polymer mixtures which comprise a polybutylene terephthalate and an aromatic polycarbonate, to obtain a better lacquer bonding is described in the non-pre-published Netherlands Patent Application 8800083.

The polymer mixture according to the invention preferably comprises as constituent D a dimethyl silicone fluid polymer.

The composition of the polymer mixture according to the invention preferably is as follows:
80–95% by weight of constituent A,
1–10% by weight of constituent B,
1–10% by weight of constituent C,
0.1–2% by weight of constituent D,
all this calculated with respect to the sum of the quantities by weight of the constituents A+B+C+D.

In addition to the constituents mentioned hereinbefore the polymer mixture according to the invention may comprise one or more conventional additives, for example, agents to improve the flame-retarding properties, stabilisers, dyes and/or pigments, fillers, reinforcing fibres, mould-release agents.

The polymer mixture according to the invention comprises at any rate the following constituents:
A. an aromatic polycarbonate,
B. a first agent to improve the impact strength, for example, as defined in the claims and as will be explained in greater detail hereinafter,
C. a second agent to improve the impact strength as defined in the claims and as will be explained in greater detail hereinafter, and
D. a dialkyl silicone fluid polymer.

A. AROMATIC POLYCARBONATE

Aromatic polycarbonates are polymers which are know per se. They are generally prepared by reacting a dihydric phenol compound with a carbonate precursor, for example, phosgene, a halogen formiate or a carbonate ester. Aromatic polycarbonates are polymers which comprise units of the formula

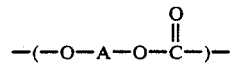

wherein A is a bivalent aromatic radical derived from a dihydric phenol used in the preparation of the polymer. Mononuclear or polynuclear aromatic compounds which comprise two hydroxy radicals each directly bonded to a carbon atom of an aromatic nucleus may be used as dihydric phenols in the preparation of the aromatic polycarbonates.

The known branched polycarbonates, for example, as described in U.S. Pat. No.4,001,184, are also suitable.

Suitable aromatic polycarbonates are the so-called polyester carbonates which are obtained by carrying out the polymerisation reaction in the presence of an ester precursor, for example, a difunctional carboxylic acid, for example, terephthalic acid or an ester-forming derivative thereof. These polyester carbonates have ester compounds and carbonate compounds in the polymeric chain. Polyester carbonates are described for example, in U.S. Pat. No. 3,169,121.

B. FIRST AGENT TO IMPROVE THE IMPACT STRENGTH

The polymer mixture according to the invention comprises as a first agent to improve the impact strength an agent built up from a core consisting substantially of a diene rubber, on which at least one shell has been grafted which consists substantially of $C_{1-6}$ alkylacrylates and/or $C_{1-6}$ alkyl methacrylates. Such agents are generally known. As a diene rubber these usually comprise a polybutadiene rubber or a poly(butadiene-styrene)rubber. One or more shells are provided by means of a so-called graft polymerisation on the rubber core which is conventionally prepared by emulsion polymerisation. One or more monomers are grafted on the rubber core. An example of a suitable monomer is methylmethacrylate. The monomer may be mixed with other monomers, for example, acrylic acid, ethacrylic acid, acrylonitrile, styrene. The monomer may further be mixed with a small quantity of a cross-linking agent.

C. SECOND AGENT TO IMPROVE THE IMPACT STRENGTH

The polymer mixture according to the invention comprises as a second agent to improve the impact strength a block copolymer with polycarbonate and polysiloxane blocks. These are block copolymers known per se. The polycarbonate blocks are preferably derived from bisphenol A and phosgene. The polysiloxane blocks are derived from siloxanes substituted with methyl-, vinyl-, and/or phenyl groups. The number of siloxane units per syloxane block preferably is 5–15.

D. DIALKYL SILICONE FLUID POLYMER

Dialkyl silicone fluid polymers are compounds known per se. For this purpose, reference may be made, for example, to Kirk-Othmer, vol. 20, 1982, pp. 936–940.

A dimethyl silicone fluid polymer having a nominal viscosity of 100 to 1,000 centistokes at 25° C. is preferably used in the polymer mixture according to the invention.

The polymer mixture may be prepared according to any conventionally used techniques, for example, by mixing in the melt. The polymer mixture is preferably prepared by compounding the individual constituents collectively in an extruder.

EXAMPLES

The following constituents are used in the examples.

PC: an aromatic polycarbonate derived from bisphenol A and phosgene having an intrinsic viscosity of 49 ml/g measured in methylene chloride at 25° C.

IM-1: a first agent to improve the impact strength built up from a core consisting substantially of polybutadiene on which a shell has been grafted consisting of polystyrene and polymethyl methacrylate. The agent consists approximately of 74% by weight of butadiene, 12% by weight of styrene and 14% by weight of methyl methacrylate.

IM-2: a second agent to improve the impact strength consisting of a linear block copolymer with polydimethylsiloxane blocks and polycarbonate blocks. The number of dimethylsiloxane units per block is on an average approximately 9.

SF: a dimethyl silicone fluid polymer having a nominal viscosity of 500 ctks at 25° C.

ST: a mixture of conventionally used stabilisers.

P: a mixture of pigments consisting substantially of titanium dioxide.

The constituents mentioned hereinbefore were compounded in an extruder in the quantities as indicated in the Table A hereinafter. Test pieces to determine the tensile strength, the elongation at fracture (according to ASTM D638), the Vicat B value (according to ASTM D1525), the Izod notched impact value (according to ASTM D256) and the environmental stress crack resistance (ESCR) were manufactured from the resulting extrudate by injection-moulding.

The ESCR was determined as follows: Four ASTM tensile rods were clamped in a bent position in holders so that a strain of 0.5% occurred in the rods. The holders with rods were then immersed for 5 minutes in a mixture of solvents consisting of 42.5% toluene, 42.5% iso-octane and 15% methanol. Sometimes the rods fracture, in most of the cases crack formation occurs. The non-fractured rods were then taken out of the holders, dried and then measured for tensile strength and elongation at fracture.

In order to determine the thermal stability the test pieces were injection-moulded in two different manners: in normal conditions, i.e. in a single-blade injection moulding machine adjusted at an average cylinder temperature of 300° C. and a cooling time of 25 seconds, and in extra heavy conditions, i.e. at an average cylinder temperature of 320° C. and a cooling time of 140 seconds.

The found results are also recorded in table A hereinafter.

TABLE A

| Example | I | II |
|---|---|---|
| Composition (Parts by weight) | | |
| PC | 90.3 | 89.9 |
| IM-1 | 4 | 4 |
| IM-2 | 4 | 4 |
| SF | — | 0.4 |
| ST | 0.6 | 0.6 |
| P | 1.1 | 1.1 |
| Properties | | |
| A Injection-moulded in normal conditions | | |
| Tensile strength at 50 mm/min. (N/mm$^2$) | 56.5 | 57.4 |
| Elongation at fracture (%) | 100 | 111 |
| Vicat B (°C.) | 143.9 | 142.9 |
| Izod notched impact (J/m) at | | |
| −30° C. | 598 | 619 |
| −35 | 563 | |
| −40 | 290 | 590 |
| −45 | | 422 |
| transition temperature ductile/brittle fracture °C. | −38 | −45 |
| ESCR 0.5 | 1 fractured | 3 with cracks |
| crack formation | 3 with cracks | 1 without cracks |
| tensile strength at 50 mm/min. (N/mm$^2$) | 22 | 48 |
| B. after injection-moulding at 320° C./140 sec. cooling time | | |
| Tensile strength at 50 mm/min. (N/mm$^2$) | 58.2 | 59.4 |
| Elongation at fracture (%) | 65 | 85 |
| Vicat B (°C.) | 142.9 | 142.4 |
| Izod notched impact (J/m) at | | |
| −20° C. | 616 | |
| −25 | 550 | |
| −30 | 423 | 561 |
| −35 | | 591 |
| −40 | | 339 |
| transition temperature ductile/brittle fracture °C. | −28 | −38 |

It may be seen from the above results that the polymer mixture according to the invention (example II) shows a more favourable transition temperature from ductile to brittle and a better environmental stress crack resistance. Furthermore the thermal stability is better: the Vicat B value decreases less as a result of injection moulding at higher temperatures. In the composition according to the invention only by 0.5° C., in the known composition (example I) by 1° C. Besides, in the polymer mixture according to the invention the transition temperature increases only by 7° C. (from −45° C. to −38° C.) and in the known polymer mixture by 10° C. (from −38° C. to −28° C.).

We claim:

1. A polymer mixture which consists essentially of "A" an aromatic polycarbonate, "B" a first agent to improve the impact strength built up from a core which consists substantially of a diene rubber and on which at least one shell has been grafted consisting substantially of $C_{1-6}$ alkyl acrylates and/or $C_{1-6}$ alkyl-methacrylates, "C" a second agent to improve the impact strength consisting of a block copolymer with polycarbonate blocks and polysiloxane blocks, characterised in that the polymer mixture comprises moreover "D" a dialkyl silicone fluid polymer.

2. A polymer mixture as claimed in claim 1, characterised in that the polymer mixture comprises as constituent D a dimethyl silicone fluid polymer.

3. A polymer mixture as claimed in claim 1, characterised in that the polymer mixture has the following composition:

80-95% by weight of constituent A,
1-10% by weight of constituent B, 1-10% by weight of constituent C,
0.1-2% by weight of constituent D,
all this calculated with respect to the sum of the quantities by weight of the constituents A+B+C+D.

4. A polymer mixture as claimed in claim 1, characterised in that the polymer mixture comprises moreover one or more of the following conventionally used additives: agents to improve the flame-retarding properties, stabilisers, dyes and/or pigments, fillers, reinforcing fibres, mouldrelease agents.

5. Articles formed from the polymer mixture as claimed in claim 1.

6. A polymer mixture which comprises
   (a) 80 to 95% by weight of an aromatic polycarbonate,
   (b) 1 to 10% by weight of a first agent to improve the impact strength built up from a core which consists substantially of a diene rubber and on which at least one shell has been grafted consisting substantially of $C_1$ to $_6$ alkyl acrylates and/or $C_1$ to $_6$ alkyl methacrylates,
   (c) 1 to 10% by weight of a second agent to improve the impact strength consisting of a block copolymer with polycarbonate blocks and polysiloxane blocks, and
   (d) 0.1 to 2% by weight of dialkyl silicone fluid polymer wherein (a) plus (b) plus (c) and (d) is 100 wt.%.

7. A polymer mixture as claimed in claim 6 wherein the dialkyl silicone fluid is a dimethyl silicone fluid.

8. A polymer mixture as claimed in claim 6 whereint he polymer mixture also comprises one or more of the following additives: agents to improve the flame retarding properties, stabilizers, dies and/or pigments, fillers, reinforcing fibers, mold release agents.

* * * * *